Patented Aug. 26, 1924.

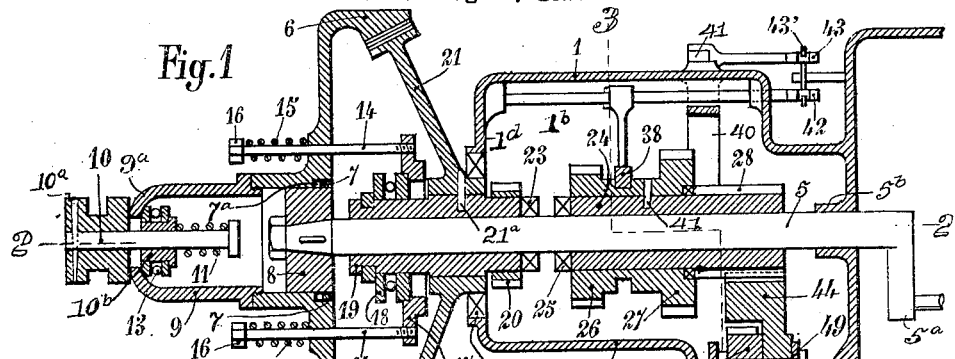

1,506,333

UNITED STATES PATENT OFFICE.

GERMAIN PIERRE BONNEVIE, OF RIVE-DE-GIER, FRANCE.

REAR AXLE FOR MOTOR VEHICLES CONSTITUTING A DRIVING AND CHANGE-SPEED UNIT.

Application filed August 7, 1920. Serial No. 401,992.

*To all whom it may concern:*

Be it known that I, GERMAIN PIERRE BONNEVIE, a citizen of the French Republic, resident of 14 Faubourg d'Egarande, Rive-de-Gier, Loire, France, have invented certain new and useful Improvements in Rear Axles for Motor Vehicles Constituting a Driving and Change-Speed Unit, of which the following is a specification.

This invention relates to improved transmission mechanism for transmitting motion from an engine shaft to the wheels of a motor vehicle.

The primary object of the invention is to furnish a transmission mechanism of simpler and more compact form than those now in use and to so construct the same that the motor, the change speed mechanism, the clutch and the differential will form a single unit.

The advantage of such a mechanism and arrangement is obvious as it reduces the weight and eliminates parts heretofore believed essential and the arrangement of the mechanism permits accurate alignment of the shafts.

With the foregoing object outlined and with other objects in view which will appear as the description proceeds the invention consists in the novel features hereinafter described in detail, illustrated in the accompanying drawings and more particularly pointed out in the appended claims.

Referring to the drawings:

Figure 1 is a horizontal sectional view of a rear axle assemblage according to this invention as viewed from above and with certain parts broken away for the purpose of clearness.

Fig. 2 is a vertical sectional view on the line 2—2 of Figure 1.

Fig. 3 is a vertical sectional view on the line 3—3 of Figure 1.

At the outset it may be stated that the motor, the change-speed mechanism, the clutch and the differential mechanism are all arranged at the rear part of the vehicle and form a rear axle assemblage.

In the drawing, 1 designates a casing which includes the motor crank chamber $1^a$, the change-speed chamber $1^b$ and the differential mechanism chamber $1^c$. The casing 1, as best shown in Figure 3, is provided with a split collar 2, the ears of which are clamped by a bolt 3 to one of the horizontal members 4 of the vehicle chassis to which the mechanism is applied. 5 designates the drive shaft which forms an extension of the crank shaft $5^a$ of the engine (not shown), and this shaft 5 has one of its ends journaled in a bearing $5^b$ forming part of the casing 1. The opposite end of the shaft 5 has keyed thereto a bearing block 8 having peripheral teeth 7 which engage internal notches $7^a$ formed in the hub of a driving clutch member 6. The hub of the clutch member is adapted to slide on the block 8 but cannot rotate relatively to said block owing to the cooperating teeth 7 and notches $7^a$.

The hub is provided with an extension or cap 9 having an apertured end $9^a$ in which is slidably mounted a plunger 10 which is keyed to a spool $10^a$ adapted to be engaged by the fork of an operating lever (not shown). The plunger 10 slides in a collar $10^b$ provided with a peripheral flange $10^c$, and a thrust bearing 13 is arranged between this flange and the head of the cap 9. The plunger 10 is provided at its rear end with a head 12, and a coil spring 11 is arranged between the sleeve $10^b$ and said head and normally tends to hold the plunger 10 in the position shown in Figures 1 and 2. A sleeve 19 is loosely mounted on the shaft 5 and carries a thrust bearing 18. A ring 17 bears against one of the rings of the thrust bearing 18 and is connected to screws or bolts 14 which pass through apertures in the clutch member 6. The outer ends of the screws 14 are provided with heads 16, and coil springs 15 are arranged between these heads and the clutch member 6 and function to yieldingly force the clutch member 6 towards a driven clutch member 21. The clutch member 21 is fixed to the sleeve 19 by means of a pin $21^a$, and a ball bearing 22 is arranged between the hub of the clutch member 21 and an end $1^d$ of the casing 1 in order to form a journal for the outer end of the shaft 5. This bearing 22 in practice is of such construction that it will prevent axial movement of the sleeve 19. It will thus be seen that the springs 15 normally tend to hold the clutch member 6 in engagement with the clutch member 21 so that movement of the shaft 5 will be directly transmitted to the sleeve 19. When the lever (not shown) connected with the spool $10^a$ is actuated to move the spool outwardly, the spring 11 will gradually take up the shock caused by the movement of said lever, and when the spring 11 is sufficiently under compression, the flange 10ᶜ, collar 10ᵇ, thrust bearing 13 and cap 9 will also move outwardly and this will cause the clutch member 6 to be moved away from the clutch member 21, and to compress the springs 15. When the operating lever is released, the springs 15 will automatically force the clutch member 6 toward the member 21. The sleeve 19 carries a fixed gear 20 and it is provided at its inner end with clutch teeth 23. A sliding collar 24 is mounted on the shaft 5 and carries fixed gears 26 and 27, and one end of the collar 24 is provided with clutch teeth 25 which are designed to be moved into engagement with the teeth 23 when it is desired that direct movement of the sleeve 19 be transmitted to the sleeve 24. The sleeve 24 is also provided with gear teeth 28 which are always in engagement with the teeth of a main differential gear 44.

Mounted in the chamber 1ᵇ directly below the shaft 5 is a parallel shaft 29. This shaft carries a fixed collar 30 having gears 31 and 32. The collar 30 is provided at one end with a recess to receive an anti-friction bearing 33 carried by a stub shaft 34 supported by the end 1ᵈ of the casing 1. As the collar 30 is fixed to the shaft 29, the bearing 33 will act as a support for one end of the shaft 29, while the other end of the shaft is supported in a bearing 35 carried by the casing 1. The gear 31 is in constant mesh with the teeth of the gear 20 so that the gear 31, collar 30 and gear 32 will be driven whenever the gear 20 is rotated. The shaft 29 is provided with longitudinally disposed peripheral teeth 29ᵃ which engage similar recesses formed internally in a gear 36 which is slidably mounted on the shaft 29. When the shaft 29 is rotated and the gear 36 is shifted into mesh with the gear 27, a first speed will be transmitted to the gear 28 and the differential gear 44. A reverse gear 37 carried by a stub shaft 37ᵃ is in constant mesh with the gear 28, and when the gear 36 is shifted into mesh with the gear 37, the rotation of the gear 28 will be reversed with consequent reversed rotation of the differential gear 44. When the collar 24 with its gears is shifted toward the right in Figures 1 and 2, the gear 26 will be brought into mesh with the gear 32 and a second speed drive will thus be provided for the differential gear 44. The collar 24 and the gear 36 are shifted by the usual fork members 38 and 39. The former is fixed to a sliding rod 42 which projects at one end beyond the casing 1 and is provided with a notch as shown. The fork 39 is carried by a swinging lever 40 which is connected to a similar lever 41 arranged on the exterior of the casing, and the last mentioned lever is connected to a rod 43 which is also notched as shown in Figure 1. A swinging latch member 43′ engages the notches of the rods 42 and 43 and couples the same together when at the dead point. The said latch member 43′ is caused to swing by the action of the control lever (not shown) when actuating one or the other of said rods.

From the foregoing I believe that the clutch and change speed mechanism may be readily understood and I will now describe the improved differential mechanism. Mounted in the opposite sides of the casing 1ᶜ of the differential casing 1ᶜ are apertured cheek plates or rings 53 which support anti-friction bearings 54 on which are mounted disks 54ᵃ which support a plurality of pinions 51 and 52 that abut against one another as shown in Figure 1. Mounted between the gear faces of the pinions 51 and 52 is the web 44ᵃ of the gear 44, and this web is apertured on its opposite sides to receive pinions 50 which are mounted on stub shafts 49 carried by the web and the disks 54ᵃ. The pinions 50 mesh with the teeth of the pinions 51 and 52 and form a planetary gearing. Each of the pinions 51 and 52 is provided with a central aperture 55 of hexagonal shape, and hexagonal disks 56 are arranged in these apertures and are driven by the pinions 51 and 52. As shown in Figure 1 the side edges of the peripheries of the disks 56 are curved in order to permit rocking movement of the disks in the apertures. These disks are fixed to the ends of the driving axles 57 which drive the wheels of the vehicle (not shown).

It is believed that the foregoing explanation will render the construction and operation of the improved mechanism readily apparent to those skilled in the art and I am aware that various changes and modifications may be made in the construction illustrated without departing from the spirit of the invention as expressed in the following claims.

What I claim and desire to secure by Letters Patent is:

1. In a drive axle assemblage and gear box (a drive shaft passing through said box, a first clutch member supported and driven by one end of said shaft, a second clutch member loosely mounted on the shaft, a differential mechanism, reducing gearing adapted to connect the second clutch member to said differential mechanism, a clutch element on said reducing gearing, a second clutch element on the second clutch member adapted to be engaged by the first mentioned clutch element and forming one of the parts for driving the differential mechanism directly from the shaft, and a train of reducing gears connected constantly with the second clutch member and cooperating with the reducing gearing for permitting a plurality of speeds forward when the clutch elements are not in direct engagement.

2. In combination, an engine crank shaft provided with an extension forming a propeller shaft, a clutch member driven by said propeller shaft, a driven clutch member mounted on the propeller shaft and cooperating with the first mentioned clutch member, a change-speed mechanism including a plurality of gears fixed together and slidably mounted on the propeller shaft, and a differential mechanism having a gear in constant mesh with one of the change speed mechanism gears and driven by said gear.

3. In combination, a prime mover shaft having an extension forming a propeller shaft, a clutch member driven by the propeller shaft and axially movable relatively to said propeller shaft, a driven clutch member loosely mounted on the propeller shaft and cooperating with the first mentioned clutch member, a gear rigidly connected to said driven clutch member, a change speed mechanism including a plurality of gears fixed together and slidably mounted on the propeller shaft and teeth which mesh with the first mentioned teeth, and a differential mechanism including a gear in constant mesh with one of the change speed mechaanisms and driven by said change speed mechanism.

4. A propelling mechanism for motor vehicles including a propeller shaft connected at one end to the crank shaft of a prime mover and provided at its opposite end with a clutch mechanism, a change speed mechanism located between the ends of the shaft and including a plurality of gears fixed together and a set of teeth, a set of teeth provided on the clutch mechanism and adapted to engage the first mentioned set of teeth when said gears are shifted in one direction, a differential mechanism driven by the change speed mechanism and including a gear in constant mesh with one of the gears of the change speed mechanism, a gear wheel provided on the clutch mechanism, a countershaft included in the change speed mechanism and having a large gear wheel and a small gear wheel fixed together, the former of which meshes with the gear wheel of the clutch mechanism, a third gear wheel slidably mounted on the countershaft and mounted to rotate with the countershaft, and a reversing gear wheel in constant mesh with one of the first mentioned gears and adapted to be engaged by the third gear wheel on the countershaft.

5. A mechanism of the kind defined by claim 4 in which the change speed mechanism and differential mechanism are enclosed within a housing forming an extension of the crank shaft casing.

In testimony whereof I have signed my name to this specification.

GERMAIN PIERRE BONNEVIE.